(12) United States Patent
Hehenberger

(10) Patent No.: US 10,006,439 B2
(45) Date of Patent: Jun. 26, 2018

(54) ENERGY PRODUCTION PLANT, IN PARTICULAR WIND TURBINE

(71) Applicant: Gerald Hehenberger, Klagenfurt (AT)

(72) Inventor: Gerald Hehenberger, Klagenfurt (AT)

( * ) Notice: Subject to any disclaimer, the term of this patent is extended or adjusted under 35 U.S.C. 154(b) by 791 days.

(21) Appl. No.: 14/386,828

(22) PCT Filed: Mar. 28, 2013

(86) PCT No.: PCT/AT2013/000052
§ 371 (c)(1),
(2) Date: Sep. 22, 2014

(87) PCT Pub. No.: WO2013/166531
PCT Pub. Date: Nov. 14, 2013

(65) Prior Publication Data
US 2015/0042293 A1 Feb. 12, 2015

(30) Foreign Application Priority Data
May 10, 2012 (AT) .................................. A 558/2012

(51) Int. Cl.
*F03D 7/02* (2006.01)
*H02H 7/06* (2006.01)
*H02P 9/04* (2006.01)

(52) U.S. Cl.
CPC ......... *F03D 7/0264* (2013.01); *F03D 7/0244* (2013.01); *F03D 7/0248* (2013.01); (Continued)

(58) Field of Classification Search
CPC .... Y02E 10/723; F03D 7/0248; F03D 7/0264
See application file for complete search history.

(56) References Cited

U.S. PATENT DOCUMENTS 7,303,373 B2 * 12/2007 Viertl ..................... G01B 11/18
415/1
7,617,741 B1 11/2009 Lowe-Wylde
(Continued)

FOREIGN PATENT DOCUMENTS

AT 508411 1/2011
DE 196 34 464 4/1997
(Continued)

OTHER PUBLICATIONS

International Search Report dated Jul. 12, 2013, corresponding to PCT/AT2013/000052.
(Continued)

*Primary Examiner* — Erin D Bishop
(74) *Attorney, Agent, or Firm* — Young & Thompson

(57) ABSTRACT

An energy production plant has a drive train including a differential gear (14) with three drive and power take-off assemblies, a first drive assembly being connected to a drive shaft, a power take-off assembly being connected to a generator (13) and a second drive assembly being connected to a differential drive assembly (16). The differential gear (14) is a planetary gear. Both an emergency brake (4) and a service brake (20) are located in the drive train. In the event of a power failure, grid fault or an emergency shutdown, the service brake (20) is activated such that the torque acting on the rotor (1) supplied by the drive train remains substantially constant for a period of at least 0.5 seconds.

21 Claims, 5 Drawing Sheets

(52) U.S. Cl.
CPC ............... *H02H 7/067* (2013.01); *H02P 9/04* (2013.01); *Y02E 10/723* (2013.01)

(56) References Cited

U.S. PATENT DOCUMENTS

| | | |
|---|---|---|
| 8,790,203 B2 | 7/2014 | Hehenberger |
| 2007/0216164 A1 | 9/2007 | Rivas et al. |
| 2010/0140952 A1 | 6/2010 | Jansen |
| 2010/0230966 A1 | 9/2010 | Pavlak |
| 2011/0169268 A1 | 7/2011 | Wei et al. |
| 2011/0215738 A1* | 9/2011 | Kamen ................... F03D 3/005 315/302 |
| 2012/0115661 A1 | 5/2012 | Hehenberger |

FOREIGN PATENT DOCUMENTS

| | | |
|---|---|---|
| DE | 10320580 | 11/2004 |
| DE | 20 2005 014 265 U1 | 1/2006 |
| JP | S59 77082 | 5/1984 |
| WO | 99/36695 | 7/1999 |
| WO | 2010/108207 | 9/2010 |
| WO | 2010/121783 | 10/2010 |
| WO | 2013/020148 | 2/2013 |

OTHER PUBLICATIONS

Austrian Search Report dated Nov. 21, 2012, corresponding to the Foreign Priority Application No. A 558/2012.

* cited by examiner

PRIOR ART

PRIOR ART

ENERGY PRODUCTION PLANT, IN PARTICULAR WIND TURBINE

The invention relates to a drive train of an energy production plant and a method for controlling the operation of a drive train of an energy production plant.

BACKGROUND OF THE INVENTION

The technical development in the area of wind turbines is leading to, i.a., larger and larger rotor diameters and tower heights. Thus, large power fluctuations due to, for example, grid faults or strong wind gusts cause a correspondingly large deflection on the tower; this in turn leads to high loads on the plant. For this reason, for example, wind turbines that for implementing a variable rotor speed generally use three-phase generators in combination with full-scale power converters are connected with large resistors via so-called choppers to the DC link of the full-scale power converter so that with a spontaneous loss of the load (for example, grid faults), the load on the rotor can be maintained and thus rapid adjustment of the rotor blades can be avoided. Rapid adjustment of the rotor blades would be necessary in a rapid load loss in order to avoid overspeed of the rotor, but it would lead to a correspondingly large change of the rotor thrust and would thus dramatically load the tower. This problem becomes greater, the higher the tower.

Similar problems can also occur in, for example, hydro-electric plants by, for example, in the case of longer-lasting grid faults, the turbine going into overspeed due to the absence of a load that under certain circumstances would cause damage to it. Likewise, for drives for industrial applications, there are also operating states in which in the case of, for example, a power failure for a short interval, a drive-side or output-side braking moment is necessary in order to bring the system into a safe state.

The time interval for recognizing the fault up to shutdown of the plant or up to the end of the grid fault can last up to several seconds, with which a correspondingly large dimensioning of the aforementioned resistors is necessary.

The method described for plants with full-scale power converters cannot be implemented, however, with classic differential systems (electromechanical, hydrostatic and hydrodynamic), since in these cases, the generator is connected directly to the grid. The same also applies, i.a., to so-called double-fed three-phase AC machines.

BRIEF SUMMARY OF THE INVENTION

The object of the invention is therefore to solve this problem.

This object is achieved with a drive train with the features disclosed below.

This object is furthermore achieved with a method with the features disclosed below.

By a service brake being mounted downstream from the rotor of the energy production plant or the industrial machine, which brake can deliver a braking torque to the drive train, in the case of, for example, wind turbines, the pitch system can react in a delayed manner; this leads to a correspondingly slow change in the thrust of the plant, and thus the load especially on the tower and on the supporting framework structure is kept as small as possible.

By a service brake being mounted between the rotor of the energy production plant or the industrial machine and the generator, which brake can deliver a braking torque to the drive train for a limited time, in the case of, for example, wind turbines, the pitch system can react in a delayed manner; this leads to a correspondingly slow change in the thrust of the plant, and thus the load especially on the tower and on the supporting framework structure is kept as small as possible.

BRIEF DESCRIPTION OF THE DRAWINGS

Preferred embodiments of the invention are explained below with reference to the attached drawings. Here.

DETAILED DESCRIPTION OF THE PREFERRED EMBODIMENTS

The output of the rotor of a wind turbine is computed according to the following formula $$\text{Rotor output} = \text{rotor area} * \text{power factor} * \text{air density}/2 * \text{wind speed}^3$$

with the power factor being a function of the high speed number (=ratio of the blade tip speed to the wind speed) of the rotor of the wind turbine. The rotor of a wind turbine is designed for an optimum power factor based on a high speed number that can be established in the course of development (generally a value of between 7 and 9). For this reason, in the operation of the wind turbine in the partial load range, a correspondingly low speed should be set in order to ensure an optimum aerodynamic efficiency.

The power input of the plant according to the aforementioned formula is proportional to the cube of the wind speed. The thrust acting on the plant is proportional to the square of the wind speed. Both, however, i.a., depend also on the set rotor blade angle. Accordingly, thrust and power approach zero as soon as the rotor blades are adjusted in the direction of the feathering position.

Figure 1:
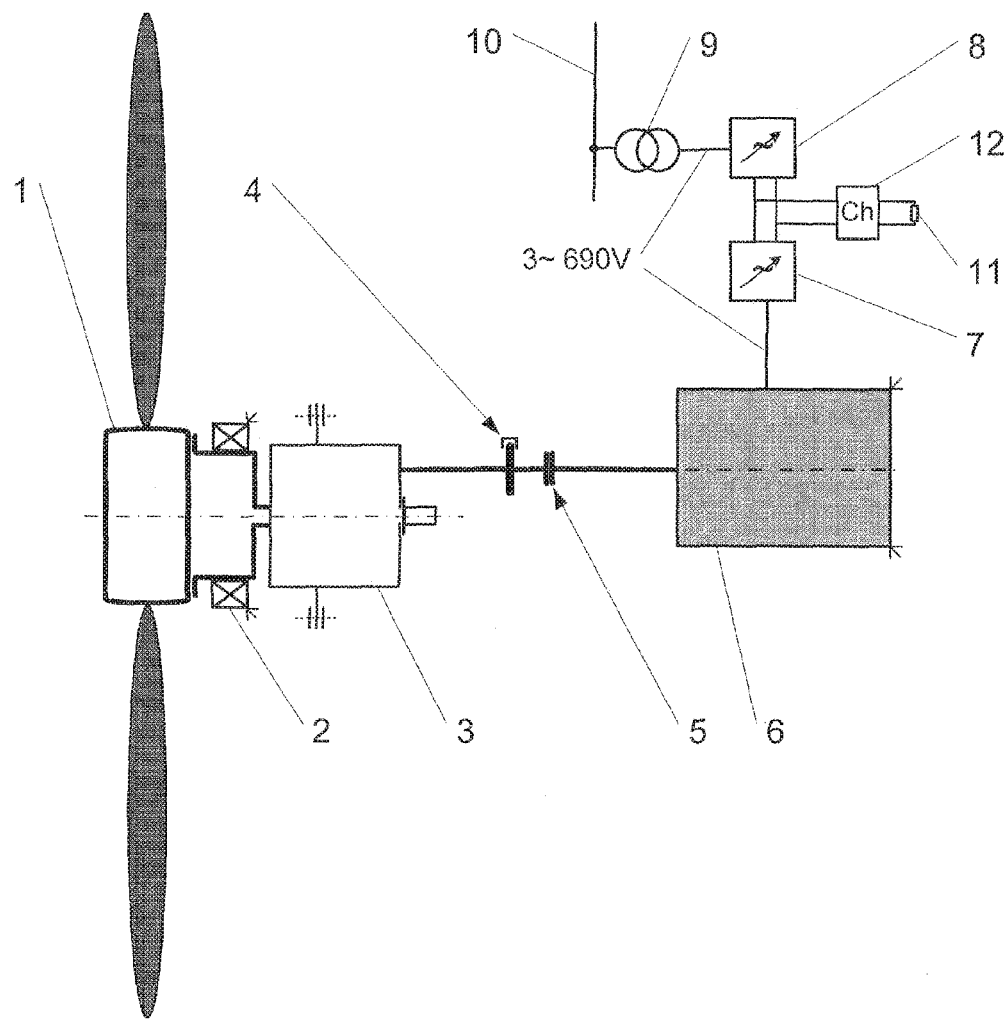
FIG. 1 shows the drive train of a wind turbine with permanent-magnet-activated synchronous generator, full-scale power converter and link chopper with a resistor according to the state of the art.

FIG. 1 shows one approach to implementing the variable speed according to the state of the art. The rotor 1 of the wind turbine is supported in the machine frame with a rotor bearing arrangement 2. The rotor 1 in most cases is a so-called three-blade rotor with for the most part individually adjustable rotor blades. By adjusting the rotor blades, the power input of the drive train of the plant is controlled, or it can be switched off as much as possible without load by adjusting the rotor blades in the direction of the feathering position. In order to be able to reliably shut down the plant, the rotor blades are generally adjusted individually, as a result of which a required redundancy arises and thus the rotor blade adjustment is also used as an emergency brake.

Subsequently, the rotor 1 drives the main gear 3. This main gear 3 generally consists of two planetary gear stages and one spur gear stage. With reference to the number and type of gear stages, however, there are a host of variants here. The fast-running side of the main gear is generally connected by means of a clutch 5 to the generator 6, for example a permanent-magnet-activated low-voltage synchronous machine. For safety reasons, in addition or alternatively to rotor blade adjustment, there is an emergency brake 4 that in most cases is located between the main gear 3 and the generator 6 and that can also be made only as a restraining brake (for example for maintenance purposes). The emergency brake 4 is generally a non-positive device, for example a disc brake, but can also be made as a positive device, for example as a rotor-arresting device. Moreover, the emergency brake 4 can also be positioned between the rotor 1 and the main gear 3 or upstream or downstream from the generator 6. The main function of this emergency brake 4 is to reliably shut down the plant when a fault occurs or for protection of personnel, preferably in combination with the aforementioned rotor blade adjustment. Thus, the emergency brake 4 is a self-contained protective apparatus that (based on the valid standards) generally may not assume further operating functions. The rotor blade adjustment that is not shown in the drawings can theoretically also perform solely the function of the emergency brake 4 that in this case would not be necessary. The generator 6 is connected via a frequency converter to a rectifier 7 and an inverter 8 and a transformer 9 to the medium-voltage grid 10. A so-called chopper 12 with a resistor 11 is connected to the DC link that connects the rectifier 7 and the inverter 8.

Figure 2:
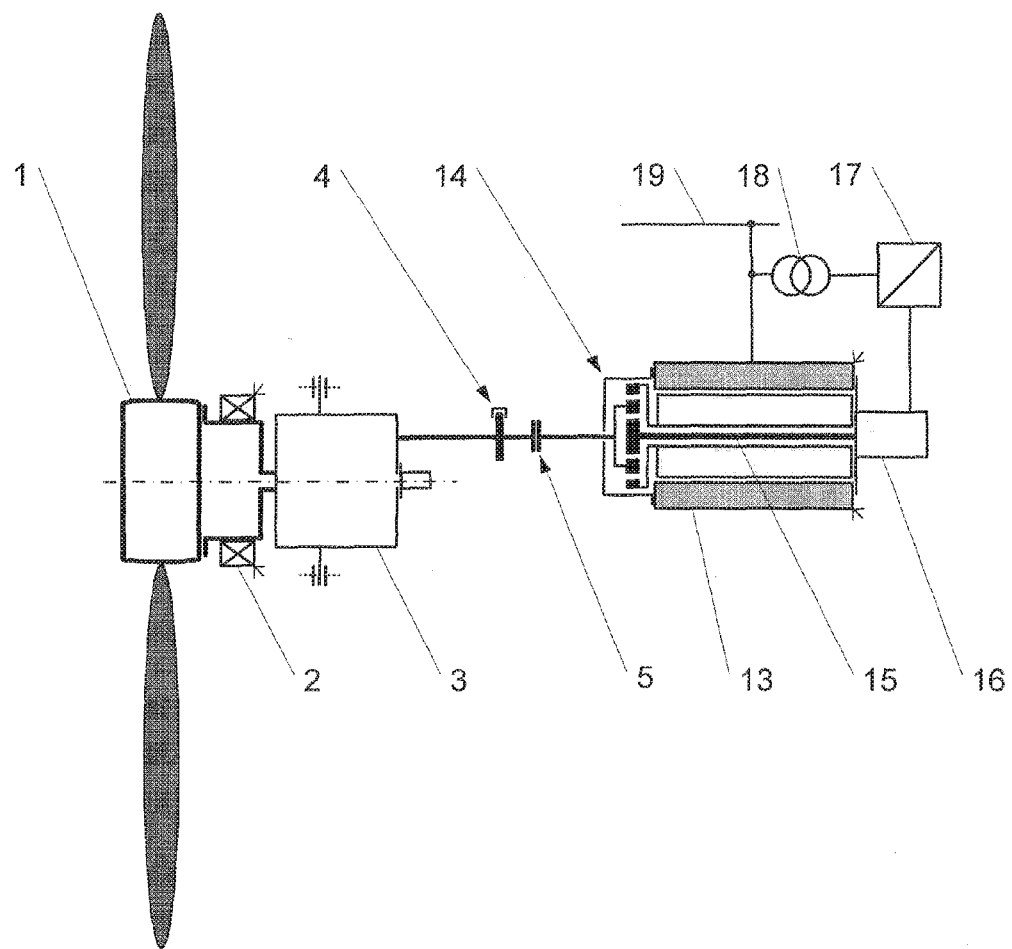
FIG. 2 shows the drive train of a wind turbine with a differential drive according to the state of the art.
Figure 3:
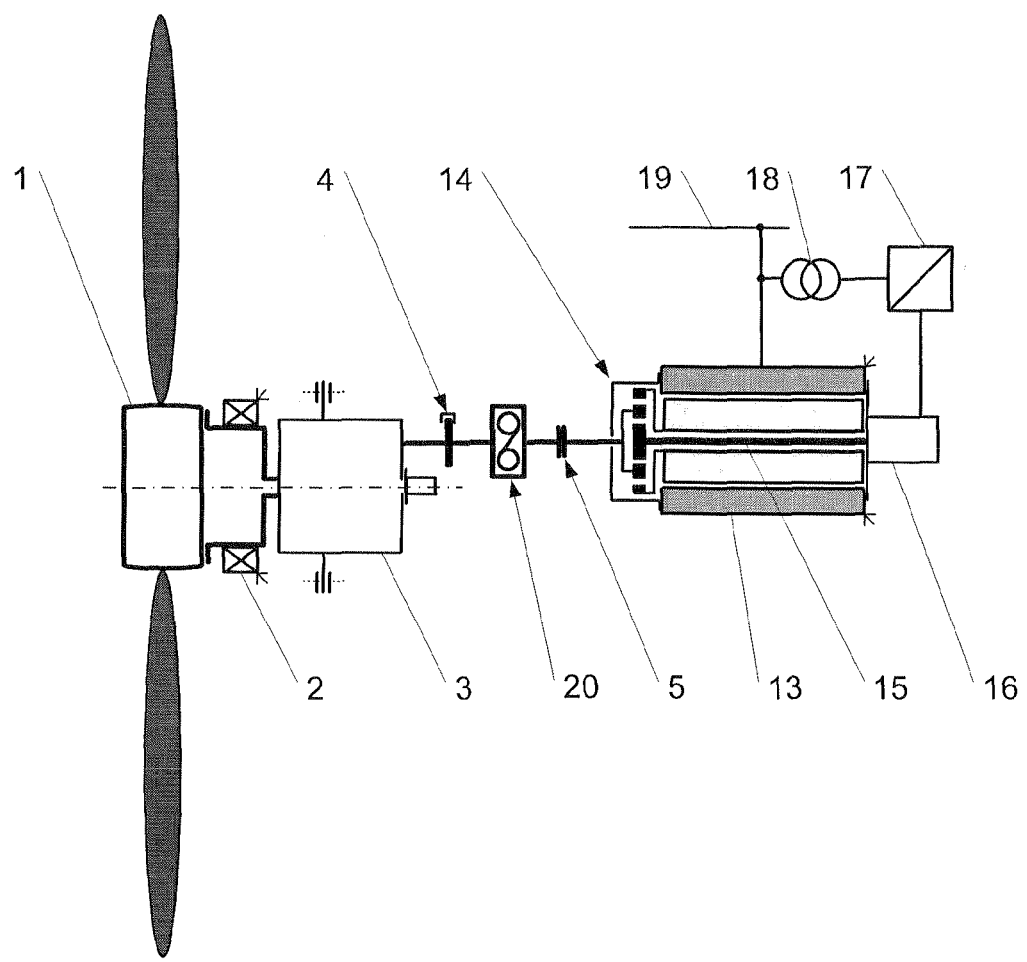
FIG. 3 shows the drive train of a wind turbine with a differential drive according to the invention.

In the examples of FIGS. 1 to 3, the rotor 1 with a rotor bearing arrangement 2, the main gear 3, an emergency brake 4, the clutch 5 and the generator 6 are the critical components of a so-called drive train. In plants for obtaining energy from ocean currents, hydroelectric turbines, or pumps, the drive train can be built similarly, but, for example, need not have components such as the main gear 3 or can have other components.

Due to a fault in the drive train or in the case of an operation-induced fast or emergency stop of the plant or in the case of a grid fault or power failure, the generator 6 can no longer accept power and a power dip occurs. With it, the torque driving the rotor 1 would bring the drive train of the plant into overspeed. In order to prevent speeds that damage the plant, theoretically the emergency brake 4, which in most cases is made as a disk brake, could be activated. In the case of a weak grid 10, however, the latter often fails; in any case, this also leads to a power dip. For reasons of safety technology, therefore for this recurring operating state, the use of an emergency brake 4 is not acceptable. Therefore, in plants according to the state of the art, the overspeed is prevented by prompt adjustment of the rotor blades, as a result of which activation of the emergency brake 4 can be avoided. One major disadvantage of this method is that in this way, the thrust acting on the plant is also accordingly promptly reduced; this leads mainly to a high load on the tower of the plant. Another disadvantage would be that in the case of a short-term power failure, that is a power failure with a briefly recurring rated voltage, abbreviated LVRT, it can last for a relatively long time until the plant returns to the power level that was produced before the occurrence of this grid fault since the rotor blade adjustment must again return to the original working position; this sometimes lasts longer than is required by the current grid-feed regulations.

For this reason, in the meantime in plants according to the state of the art, the chopper 12 and the resistor 11 are dimensioned such that they can accept the rated output of the plant for several seconds and can convert it into heat. The resulting advantage is that the torque on the drive train can be maintained for the time being and thus rapid rotor blade adjustment is not necessary, as a result of which the thrust acting on the plant also does not change suddenly. Moreover, when the grid returns, the power delivered into the grid can be again promptly adjusted upward since then instantaneously the inverter 8 can again deliver power into the grid while the chopper at the same time sets back the energy delivered into the resistors. In the ideal case, the torque on the drive train thus remains constant during a brief line voltage dip.

FIG. 2 shows a known concept of a wind turbine with an electromechanical differential drive. The drive train of the wind turbine also begins here fundamentally at the rotor 1 with its rotor blades and ends with the generator 13. Likewise here, the rotor 1 also drives the main gear 3 and subsequently the differential gear 14. The generator 13 is connected to the internal gear of the differential gear 14, and its pinion is connected to the differential drive 16. The differential gear 14 in the illustrated example is 1-stage, and the differential drive 16 is in a coaxial arrangement both to the output shaft of the main gear 3 and also to the drive shaft of the generator 13. In the illustrated embodiment for the generator 13, there is a hollow shaft that allows the differential drive 16 to be positioned on the side of the generator 13 facing away from the differential gear 14. In this way, the differential stage is preferably a separate assembly that is linked to the generator 13 and that then is preferably connected via an emergency brake 4 and a clutch 5 to the main gear 3. The same as already stated in the explanation for FIG. 1 also applies appropriately to the emergency brake 4. The connecting shaft 15 between the differential gear 14 and the differential drive 16 preferably in a variant with an especially low mass moment of inertia is made as, for example, a fiber composite shaft with glass fibers or carbon fibers or a combination of the two materials, in which different segments of the shaft have different materials. The differential drive 16 is linked to the medium-voltage grid 19 by means of a frequency converter 17 and a transformer 18. An important advantage of this concept is that the generator 13, preferably a remotely-activated medium-voltage synchronous generator, can be linked directly, i.e., without complex power electronics, to the medium-voltage grid 19. The equalization between variable rotor speed and fixed generator speed is implemented by the variable-speed differential drive 16 that has an output of preferably roughly 15% of the total plant output.

The torque equation for the differential drive is as follows:

$$\text{Torque}_{\text{differential drive}} = \text{Torque}_{\text{rotor}} * y/x,$$

with the size factor y/x being a measure of the transmission ratios in the main gear 3 and in the differential gear 14. The torque in the differential drive 16 is always proportional to the torque in the entire drive train.

One disadvantage of this concept in contrast to the plant concept according to FIG. 1 is, however, that in the case of, for example, a power failure or LVRT, the generator 13 can no longer feed power into the grid 19. Thus, the existing torque would bring the rotor 1 or the drive train of the plant into overspeed if the rotor blade adjustment system does not react immediately and quickly.

The same also applies to so-called double-fed three-phase AC machines in which the rotor of the generator is connected via a frequency converter to the grid, but the stator of the generator is connected directly or by means of a transformer. Thus, also in this case when a fault occurs, the output cannot be maintained, with which according to the state of the art, there remains only the option with the prompt adjustment of the rotor blades, which under certain circumstances acts unfavorably, as a means for avoiding overspeed.

Figure 4:
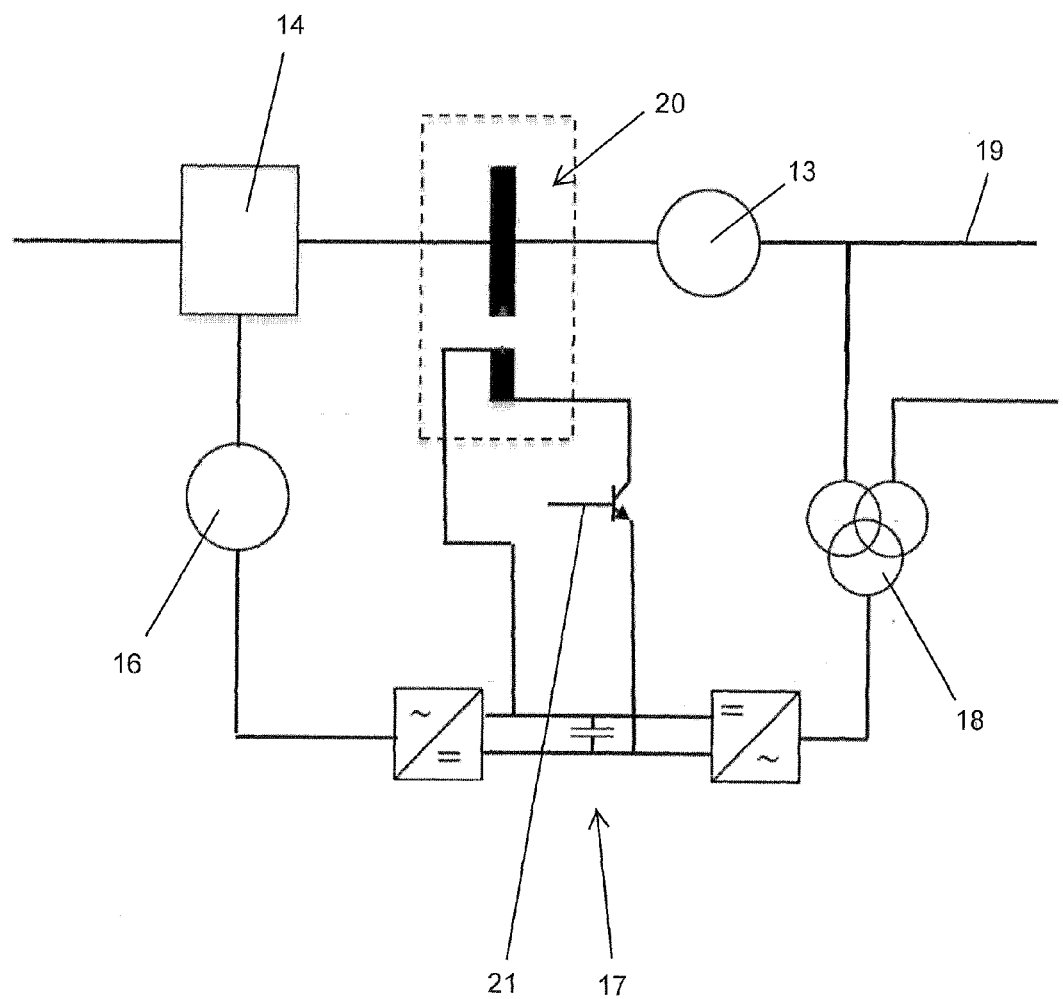
FIG. 4 shows the drive train of a wind turbine with a differential drive according to another embodiment of the invention.

FIG. 3 shows the drive train of a wind turbine with a differential drive according to this invention. Fundamentally, the latter is built the same as the one according to FIG. 2. An important difference is, however, that between the main gear 3 and the differential gear 14, a service brake 20 is installed. In the illustrated example, this brake is between the emergency brake 4 and the clutch 5, but it can alternately be positioned fundamentally anywhere in the drive train. The advantage in the positioning between the main gear 3 and the differential gear 14 is that here, the braking moment acts on the fast-running shaft of the gear and thus a torque that is as small as possible prevails. Moreover, the braking forces are apportioned according to the moments of mass inertia; this causes a large part of the braking moment to act on the rotor 1 via the main gear 3. Thus, the generator 13 and the differential drive 16 experience torque loading that is as small as possible because of the braking process. This is not the case when the service brake is connected, for example, to the rotor shaft of the generator 13, and the differential drive 16 must thus hold against the braking moment that has been applied by a service brake 20. According to the invention, this variant that is shown schematically in FIG. 4 is, however, not to be precluded. The purpose of the service brake is comparable to that of the chopper 12 and of the resistor 11 from FIG. 1, specifically that the latter can accept the rated output of the plant for several seconds entirely or if sufficient also partially and can convert it into heat. The resulting advantage is also here that a torque on the drive train can be maintained for the time being and thus no prompt rotor blade adjustment is necessary, as a result of which the thrust acting on the plant does not change suddenly.

In the case of start-up, the plant control first detects whether it is a power failure or a brief grid fault (a so-called LVRT fault) in which the plant is to remain or must remain on the grid. Depending on the technical grid feed conditions, this takes an interval from roughly 0.5 to 3 seconds during which ideally the rotor blades are not essentially reset. Thus, in a sudden return of the grid, the power to be delivered to the grid can be very quickly adjusted up by the power that has been "destroyed" by the service brake 20 being reduced correspondingly promptly. Ideally, the service brake 20 should be regulated such that the torque acting on the rotor 1 from the drive train remains essentially constant over this time interval or is at least so high that an overspeed of the rotor 1 is prevented. This works much more quickly than what could be accomplished by adjusting the rotor blades. If this is not the case and there is another fault, the plant can slowly shut down. Such a shutdown process can last, for example, up to 15 seconds, during which correspondingly large amounts of energy must be removed, for example converted into heat. In doing so, the torque acting on the rotor 1 from the drive train is adjusted accordingly toward zero, after preferably at most 7 seconds, but ideally, in order to limit the thermal load, after roughly 3 to 5 seconds.

In summary, it can be maintained that the main function of the service brake 20 is to limit the rotor speed and/or the generator speed, since thus rapid adjustment of the rotor blades is for the most part no longer necessary. In contrast to this, the emergency brake 4 is intended to shut down (rotor speed roughly 0 $min^{-1}$) the plant.

The service brake 20 can assume different embodiments. Here, for starters, the group of hydrodynamic retarders should be mentioned. Hydrodynamic retarders generally work with oil that if necessary is routed into a converter housing. The converter housing consists of two rotationally symmetrical and opposite blade wheels, a rotor that is connected to the drive train of the plant, and a stationary stator. The rotor accelerates the supplied oil, and the centrifugal force forces it to the outside. The shape of the rotor blades routes the oil into the stator that in this way brakes a braking torque in the rotor and subsequently then also brakes the entire drive train.

Friction converts the energy of motion into heat that must be removed again by a heat exchanger; this can take place, for example, using a cooling water circuit of the plant. For activation, the retarder is preferably flooded with oil from a storage tank, which oil is automatically pumped back again by the blade wheels.

Another execution option is a water retarder that likewise works according to the hydrodynamic principle, but uses water instead of oil as the brake fluid. The braking moment is built up according to the fill factor and the speed difference between the rotor and stator. The energy that arises in doing so is converted solely into heat energy in the hydrodynamic working space of the retarder and is absorbed directly by the cooling water. The heated cooling water is cooled directly via the cooling water circuit of the plant in this case. This cooling water circuit is generally present anyway in order to be able to cool, for example, the generator 13, the differential drive 16, and the frequency converter 17, etc.

In the case of an electrodynamic retarder as the service brake, for example an eddy-current brake, for example two steel disks (rotors) that are not magnetized are connected to the drive train. In between is the stator with electric coils. When current is applied by activating the retarder, magnetic fields are generated that are closed by the rotors. The magnetic fields with opposite directions then generate the braking action. The heat that has formed is, for example, dissipated again by internally ventilated rotor disks.

One important advantage of a retarder as a service brake is its absence of wear and ease of regulation. Thus, the braking moment can be adjusted or optimized depending on the operating state of the plant, or over the course of a braking operation.

Alternatively, a disk brake is also conceivable as the service brake 20. Here, so-called pole friction brakes are especially suitable due to the activation that sometimes recurs frequently. A pole friction brake has fundamentally the same structure as a disk brake, but has friction linings made of steel that are almost free of wear. The braking moment can also be adjusted here.

FIG. 4 shows a differential drive according to another embodiment of the invention. In the illustrated example, the service brake 20 is connected to the rotor shaft of the generator 13. The service brake 20 is made here as an electrodynamic retarder. The power for the activation of the service brake 20 is taken from a DC link of the frequency converter 17. Thus, the differential drive 16 acts additionally as a brake. By means of a controllable semiconductor bridge 21, preferably an IGBT, the exciting current for the retarder 20 can be regulated according to the required braking moment. The required braking moment for the service brake 20 depends on the plant system management. For wind turbines according to the description for FIG. 2, this can reach roughly up to the level of the rated torque of the drive train, but if necessary can even be higher. For optimum tuning between the rotor blade adjustment, the allowed overspeed for the components of the drive train and the braking moment of the service brake, the required braking moment for the service brake 20 can, however, also be significantly smaller.

The braking moment acting on the drive train is distributed to the rotor shaft of the generator 13 and the differential drive 16 according to the transmission ratio of the differential gear 14. For a transmission ratio of, for example, 5, the braking moment acting on the drive train rises by roughly 20%, compared to a retarder that has been positioned as in FIG. 3.

Moreover, the system that is shown in FIG. 4 can be very easily regulated. The frequency converter 17 can be made and operated according to the invention as described in WO 2010/121783 A or WO 2013/020148 A and can have an electrical energy storage mechanism or a chopper with a resistor, in the link. Thus, the energy that is necessary for the activation of the electrodynamic retarder 20 is also available at any time; this enables the use of the service brake 20 independently of the state of the grid 19.

The task of regulation is thus to prevent an overspeed of the drive train; at the same time, for example in the LVRT case, the speed or the phase angle of the generator 13 can be kept constant. I.e., the differential drive 16 and the frequency converter 17 that is connected to it in this embodiment according to the invention must perform two functions: first, the supply of the service brake 20 with exciting current from the DC link of the frequency converter 17, and second, the regulation of the speed of the generator 13 in order to be essentially in phase with the grid 19 when the latter returns.

Figure 5:
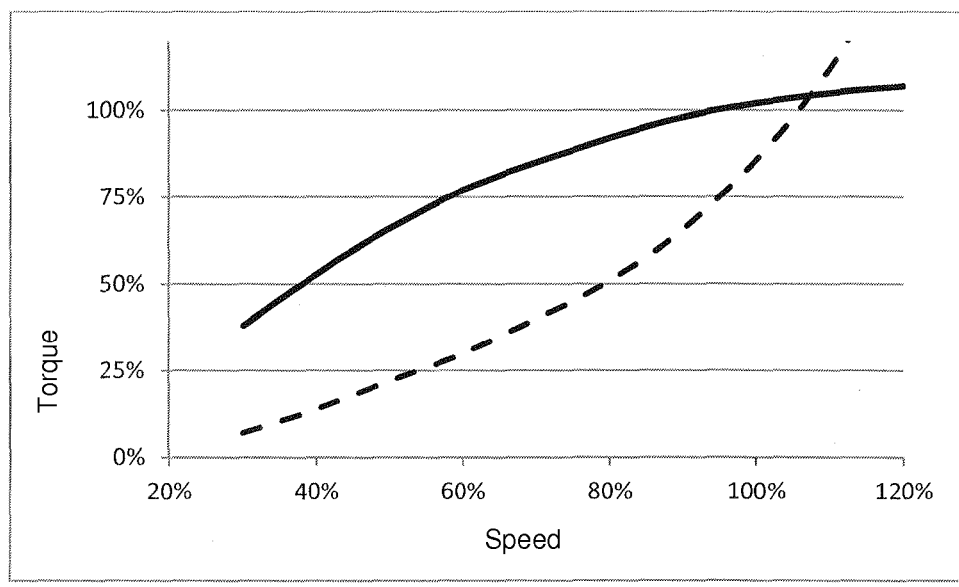
FIG. 5 shows a conceivable characteristic for a service brake system according to the invention.

FIG. 5 shows possible characteristics for retarders. For example, here a continuous line as a typical characteristic for a hydrodynamic retarder and a broken line as a typical characteristic of an electrodynamic retarder are shown. By specific design of the retarder, its design characteristic can be matched to requirements. In operation, the characteristics for hydrodynamic retarders can be changed by variation of the fill factor and for electrodynamic retarders by variation of the exciting current.

For example, the characteristic for the service brake 20 is fixed such that it approaches the speed/torque characteristic of the plant as closely as possible, as a result of which, for example, in a power failure, the behavior of the plant is hardly changed compared to normal operation. In this connection, a hydrodynamic retarder when used on a flow machine is an especially good choice since a retarder fundamentally likewise has a cubic characteristic and thus, for example, a somewhat necessary regulation effort can be kept low.

At a speed equal to zero, the retarder does not generate a braking moment. Since in the case of energy production plants at low plant speed only a low torque also prevails, in this way, however, an application-specific disadvantage does not arise.

Figure 6:
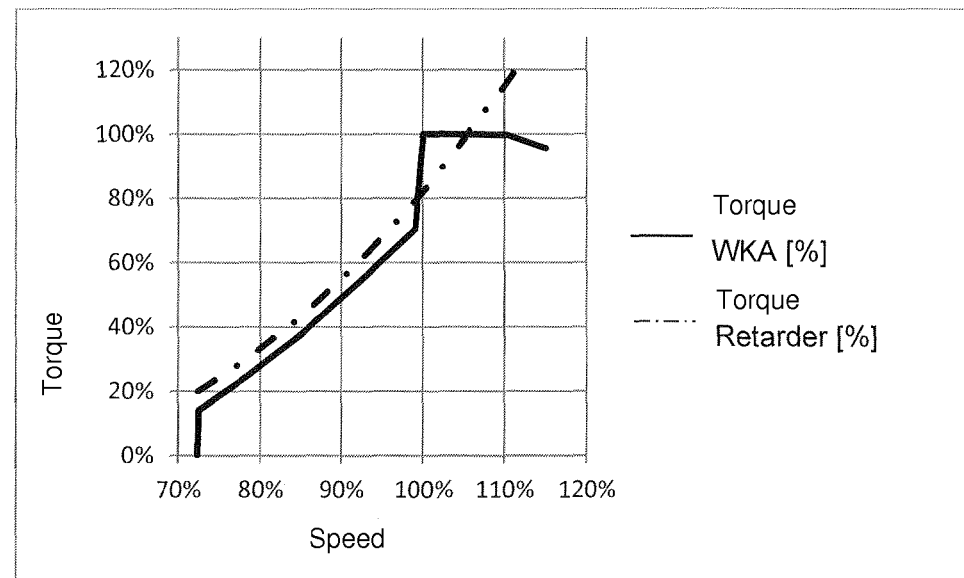
FIG. 6 shows a characteristic according to the invention for a service brake system compared to a typical torque characteristic of a wind turbine.

This is shown by FIG. 6. In this case, the continuous line shows a typical torque/speed characteristic for a wind turbine. Here, the point with 100% speed and 100% torque describes the nominal working point of the wind turbine. Around roughly 105% of the speed, the plant in nominal operation adjusts itself at preferably constant torque. Above a speed of 110%, the torque drops again, in doing so up to a speed of 115% the wind turbine being operated with constant output. When 115% of the speed is exceeded, the plant is generally taken off the grid. In the operating range below the nominal working point, an effort is made to approach a cubic characteristic as closely as possible, here design-specific speed limits having to be observed.

The broken line is the characteristic of the retarder, which preferably describes a cubic line. At the middle operating point in nominal operation of the plant that is, for example, at roughly 105% of the speed, the torque line of the wind turbine intersects the characteristic of the retarder.

In one especially simple embodiment variant, the variation of the fill factor is omitted, and the characteristic is laid out such that at the intersection point of the two characteristics, a braking moment at the level of the nominal torque of the plant is reached. Since the rotor of the wind turbine, when the rotor blade adjustment is not active, likewise follows a cubic characteristic, the plant in the case of a brief power failure is kept adequately in balance by the service brake 20. Admittedly, the effect is not perfect for all operating ranges, but since a power dip in operation of the plant with high output has an especially harmful effect, this simplification is a good compromise between, on the one hand, the behavior of the plant in the case of a fault and, on the other hand, the complexity of a service brake 20. The torque characteristic of the service brake 20 shown in FIG. 6 runs over most of the operating range roughly in the region of the torque characteristic of the wind turbine. By exact regulation of the fill factor and of the exciting current, still better agreement of the two characteristics can be achieved as far as a largely exact overlap of the two characteristics. In the operation of the plant, the speed of the drive train will, however, adjust itself anyway to the characteristic of the service brake, and in this way an overspeed will be prevented. The power that can be delivered when the grid returns can then be regulated by the automatic load regulation of the plant according to the requirements from the grid feed conditions and the given operating conditions.

In the described embodiment, the drive machine is the rotor of a wind turbine. Instead of this, however, rotors can also be used to extract energy from ocean currents, hydroelectric turbines and pumps. Moreover, the embodiment according to the invention can also be used for industrial applications in order to, for example, be able to brake in a system disruption in the operating mode to prevent an overspeed in the case of a fault.

According to the invention, the service brake (20) can also be used for energy production plants according to FIG. 1, the service brake being located in the drive train especially between the main gear 3 and the generator 6.

The invention claimed is:

1. A method for regulating the operation of a drive train of an energy production plant, the drive train of the energy production plant being comprised of a rotor (1) that drives an electrical machine (6, 13), a service brake that when activated provides torque acting on the rotor, the electrical machine (6, 13) being connected to a network (10, 19), comprising the step of:
   in a case of a power failure, grid fault or emergency shutdown, activating the service brake (20) so that torque acting on the rotor (1) remains essentially constant over a time interval of at least 0.5 seconds and up to 7 seconds.

2. The method of claim 1, wherein the drive train of the energy production plant further includes an emergency brake (4).

3. The method according to claim 2 wherein the electrical machine (6, 13) is a generator (13), wherein the drive train of the energy production plant further comprises a differential gear (14) having a first drive connected to a drive shaft, an output connected to the generator, and a second drive, and wherein the differential gear (14) is a planetary gear, and wherein the service brake (20) is located in the drive train upstream from the differential gear (14).

4. The method according to claim 3, wherein in the drive train upstream from the differential gear (14), there is a main gear (3), and wherein the service brake (20) is located between the main gear (3) and the differential gear (14).

5. The method according to claim 2 wherein the drive train of the energy production plant further comprises a differential gear (14) having a first drive connected to a drive shaft, an output, and a second drive, wherein the differential gear (14) is a planetary gear, and wherein the service brake (20) is located in the drive train upstream from the differential gear (14).

6. The method according to wherein the drive train of the energy production plant further comprises a differential gear (14), and wherein the service brake (20) is located in the drive train between the differential gear (14) and the generator (13).

7. The method according to claim 2, wherein the electrical machine is a double-fed three-phase AC machine.

8. The method according to claim 2, wherein the electrical machine is a permanent magnet-activated synchronous machine.

9. The method according to claim 2, wherein the service brake (20) is a hydrodynamic or electrodynamic permanent brake that is free of wear.

10. The method according to claim 9, wherein the electrical machine is connected to the network (19) by a frequency converter (17), and wherein the service brake (20) is an electrodynamic brake that is connected to a DC link of the frequency converter (17).

11. The method according to claim 10, wherein the DC link has an electrical energy storage mechanism.

12. The method according to claim 9, wherein the hydrodynamic service brake (20) is incorporated into a cooling circuit of the energy production plant.

13. The method according to claim 2, wherein the service brake 20 is a pole friction brake.

14. The method according to claim 2, wherein a rise of a torque characteristic of the service brake (20) in a range above a nominal speed of the energy production plant is greater than a rise of a torque characteristic of the energy production plant.

15. The method according to claim 2, wherein a rise of a torque characteristic of the service brake (20) in a range of a nominal speed of the energy production plant is smaller than a rise of a torque characteristic of the energy production plant.

16. The method according to claim 2, wherein a rise of a torque characteristic of the service brake (20) in a range above a nominal speed of the energy production plant intersects a torque characteristic of the energy production plant.

17. The method according to claim 2, wherein a torque characteristic of the service brake (20) up to a nominal torque of the energy production plant runs essentially parallel to a torque characteristic of the energy production plant.

18. The method according to claim 1, wherein, during the activating of the service brake (20), the time interval of that torque acting on the rotor (1) remains essentially constant is up to 5 seconds.

19. A method for regulating the operation of a drive train of an energy production plant, the drive train of the energy production plant being comprised of a rotor (1) that drives an electrical machine (6, 13), a service brake that when activated provides torque acting on the rotor, the electrical machine (6, 13) being connected to a network (10, 19), comprising the step of:
in a case of a power failure, grid fault or emergency shutdown, activating the service brake (20) so that torque acting on the rotor (1) remains essentially constant over a time interval of at least 0.5 seconds and up to 3 seconds.

20. A method for regulating the operation of a drive train of an energy production plant, the drive train of the energy production plant being comprised of a rotor (1) that drives an electrical machine (6, 13), a service brake that when activated provides torque acting on the rotor, the electrical machine (6, 13) being connected to a network (10, 19), comprising the step of:
in a case of a power failure, grid fault or emergency shutdown, activating the service brake (20) so that torque acting on the rotor (1) remains essentially constant over a time interval of at least 0.5 seconds, wherein a braking moment of the service brake (20) is reduced to roughly zero in a further time interval of 5 to 20 seconds.

21. The method according to claim 20, wherein the time interval that the braking moment of the service brake (20) is reduced to roughly zero is 10 to 15 seconds.

* * * * *